United States Patent [19]
Collard et al.

[11] Patent Number: 5,643,539
[45] Date of Patent: Jul. 1, 1997

[54] REGENERATIVE INCINERATION SYSTEM

[75] Inventors: Wayne G. Collard, Swartz Creek; Sean T. Gribbon, Farmington Hills; Kenneth R. Woodside, Northville, all of Mich.

[73] Assignee: Salem Engelhard, South Lyon, Mich.

[21] Appl. No.: 206,870

[22] Filed: Mar. 4, 1994

[51] Int. Cl.⁶ ............................................. B01D 53/34
[52] U.S. Cl. .................. 422/178; 422/171; 422/177; 422/211; 422/212; 422/223; 55/523; 55/242; 55/288; 55/DIG. 30
[58] Field of Search .................... 422/168–171, 422/175, 177, 178, 211, 212, 217, 223, 239, 311, 900; 55/242, 288, 282, 391, 392, 394, 395, 428, 429, 466, 492, 494, 512, 516, 518, 523, DIG. 30, DIG. 31; 95/273, 274, 276, 278, 281

[56] References Cited

U.S. PATENT DOCUMENTS

| | | | |
|---|---|---|---|
| 3,870,474 | 3/1975 | Houston | 422/178 X |
| 3,930,803 | 1/1976 | Winter | 55/288 X |
| 4,372,111 | 2/1983 | Virk et al. | 422/178 X |
| 4,544,388 | 10/1985 | Rao et al. | 55/288 X |
| 5,000,422 | 3/1991 | Houston | 251/306 |
| 5,016,547 | 5/1991 | Thomason | 110/211 |
| 5,143,700 | 9/1992 | Anguil | 422/178 X |
| 5,228,892 | 7/1993 | Akitsu et al. | 55/523 |

*Primary Examiner*—Timothy McMahon
*Assistant Examiner*—Hien Tran
*Attorney, Agent, or Firm*—Lyman R. Lyon, P.C.

[57] ABSTRACT

A filter utilizes a filter bed having a ceramic media to remove particulates from process emissions upstream of a regenerative incinerator to prevent fouling of the incinerator. To prevent the filter from fouling, the filter is adapted to "bake-off" contaminants from the filter bed by providing a flow of hot innocuous air through the filter. In addition, fluid can be flushed through the filter.

1 Claim, 2 Drawing Sheets

REGENERATIVE INCINERATION SYSTEM

BACKGROUND OF THE INVENTION

The present invention relates generally to incinerator systems for the abatement of process emissions and more particularly, to a novel filter for a regenerative incinerator used in oxidizing contaminants from process emissions.

Process emissions often contain combustible contaminants that, if released to the atmosphere, have the potential of polluting the environment. However, the amount of combustible material contained in such emissions is generally below several thousand ppm and, accordingly, will not ignite or propagate a flame at ambient temperature.

Incinerators increase the temperature of such process emissions to a level above the ignition temperature of the combustible contaminants by the use of heat derived from a supplemental energy source, therefore allowing for oxidation of the emissions. Regenerative incinerators recover heat remaining in the cleansed exhaust gas to increase the temperature of emissions entering the incinerator thereby minimizing the amount of supplemental energy required to raise the emission to its ignition temperature.

Known regenerative incinerators typically comprise a plurality of conventional regenerator beds that communicate with a combustion chamber. The regenerator beds contain conventional ceramic heat exchange elements. Admission of emissions into each regenerator bed is controlled by a valve network. During operation of a regenerative incinerator that contains, for example, three regenerator beds, emissions pass through a first regenerator bed to pick up heat therefrom, thence to the combustion chamber for oxidation. Following oxidation to $CO_2$ and $H_2O$, the cleansed air then passes through a second regenerator bed, which is operating in the regenerative, or heat receptive, mode for discharge to atmosphere or to a purified air duct which conducts purified air to a third regenerator bed to purge the bed of contaminants. Thus, each regenerator bed performs three modes of operation: a feed mode, a heat receptive mode, and a purge mode.

The process emissions that require abatement control devices, such as found in the wood industry, or in coating, laminating, painting, or dry cleaning processes, often create difficulty because of a suspended particulate in the exhaust air which feeds the regenerative incinerator. Thus, one problem that materially effects the efficiency of such incinerators is fouling and plugging of regenerator beds because of the presence of this particulate. Moreover, often these particulates typically contain inorganic material, creating undesirable solid particles of noncombustible ash, known as fly ash, when burned.

Accumulation of the particulate material, such as under a regenerator bed in a regenerative incinerator, will plug the bed thereby preventing or severely reducing the flow of the process emissions or cleansed air, depending upon the mode of operation for the regenerator bed. Attempts to burn or "bake" off the particulate material are inadequate because residual fly ash generally collects in the mid-bed regions, which are higher than the typical fouling segments. This phenomenon creates great difficulties and thus regenerative incinerators become too inefficient for process emissions that contain these particulates.

SUMMARY OF THE INVENTION

The aforesaid problem is solved, in accordance with a preferred constructed embodiment of the present invention, by a filter to be used in conjunction with a regenerative incinerator. Because the filter of the present invention is positioned upstream of the regenerative incinerator relative to the flow of process emissions, the present invention protects the regenerative incinerator from fouling by reducing or eliminating both noncombustible and combustible particles from the process emissions prior to admission of the process emissions into the regenerative incinerator.

The filter of the present invention comprises a heat resistant ceramic media located within the filter. Process emissions containing the particulate enter an input duct from a feed line. The input duct admits the particulate laden process emissions into a lower plenum of the filter. The emissions then travel upwardly through the ceramic media, which reduce or eliminate the particulate content of the process emissions. Following passage through the filter bed, the emissions are accepted by an upper plenum, which is in communication with an outlet duct, which transports the process emissions with a reduced content of particulates to a regenerative incinerator.

To prevent the filter from fouling, the filter is adapted to "bake-off" the fouling material from the filter bed. Thus, as the filter fouls or loads, the contaminating material is purged by burning off the contaminants. To effect "bake-off," innocuous air enters the input duct from a feed line, and a supplementary heat source and temperature controller maintain the temperature of the innocuous air at, for example, 1000° F. (≈537° C.). The hot innocuous air then travels from the lower plenum through the filter bed and into the upper plenum, where the hot innocuous air can also be transported to the regenerative incinerator by the outlet duct. Moreover, the filter can also advantageously accommodate fluid washing to remove fly ash.

DETAILED DESCRIPTION OF THE PREFERRED EMBODIMENT(S)

Figure 1:
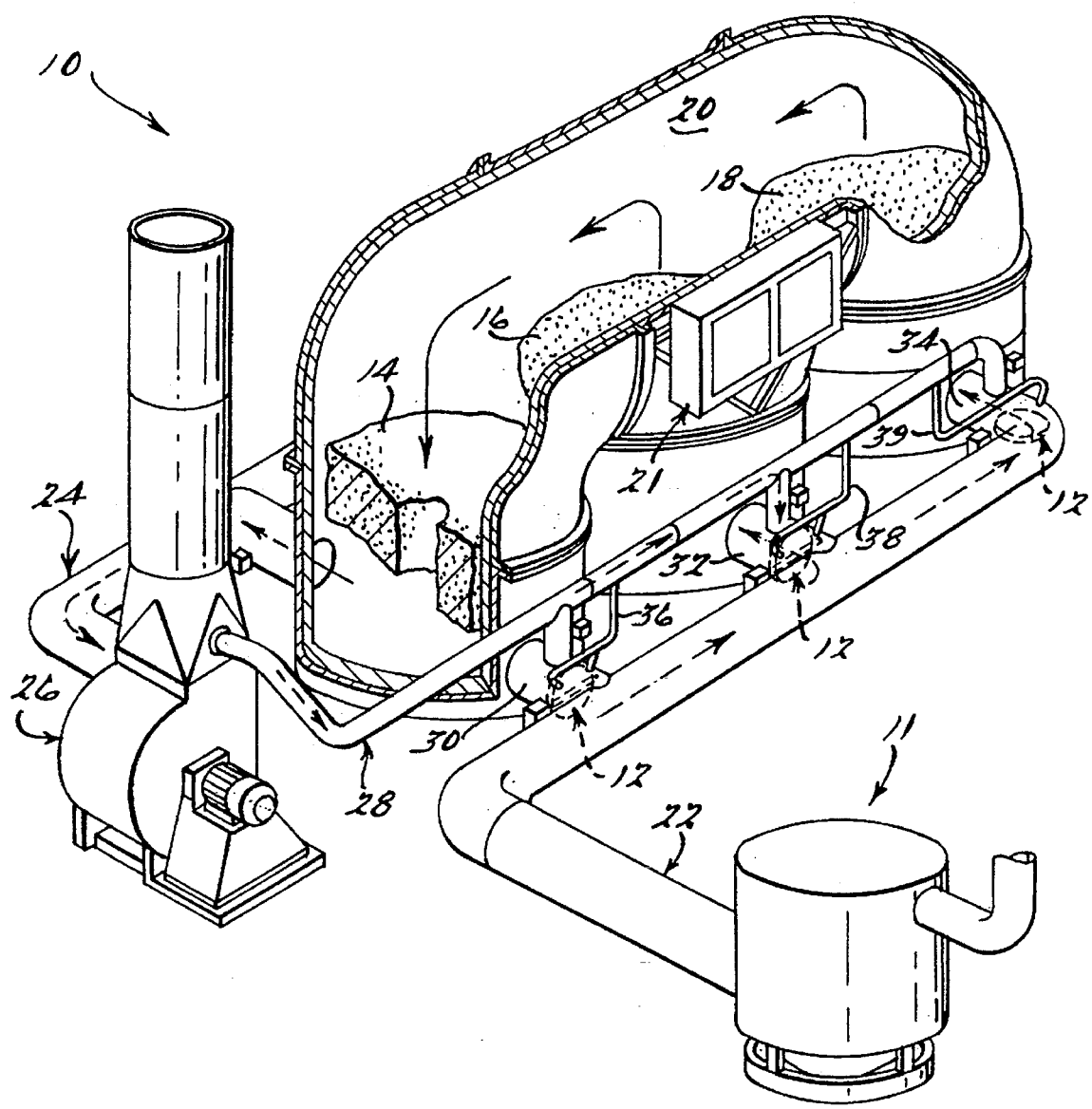
FIG. 1 is a perspective view, partially in section, of a filter positioned upstream of a regenerative incinerator.

As seen in FIG. 1 of the drawings, a regenerative incinerator 10 comprises the environment wherein the instant invention has particular utility. In accordance with a preferred constructed embodiment of the present invention, a filter system is positioned upstream of the regenerative incinerator 10 relative to a flow of process emissions so that the filter 11 protects the regenerative incinerator 10 from fouling.

The incinerator 10 utilizes a plurality of valves 12 to control the flow of contaminated emissions and cleansed air to and from the incinerator 10, respectively. The incinerator 10 comprises a plurality of conventional regenerator beds 14, 16 and 18 that communicate with a combustion chamber 20. Fuel, for example natural gas, is supplied to the combustion chamber 20 from a fuel control and burner 21. Emissions are conducted to the incinerator 10 from the filter 11 by an outlet duct 22. Cleansed air is conducted away from the incinerator 10 by a duct 24 that is in fluid communication relationship with an exhaust blower 26. Exhaust air is vented to atmosphere or conducted through a conduit 28 to ducts 30, 32 and 34 to purge the regenerator beds 14, 16 or 18, selectively, or to ducts 36, 38 or 39 to pressurize the valves 12. After passing the selectively opened valves 12, the contaminated fluids are ducted to the regenerative beds 14, 16 and 18 by ducts 30, 32 and 34, respectively.

Figure 2:
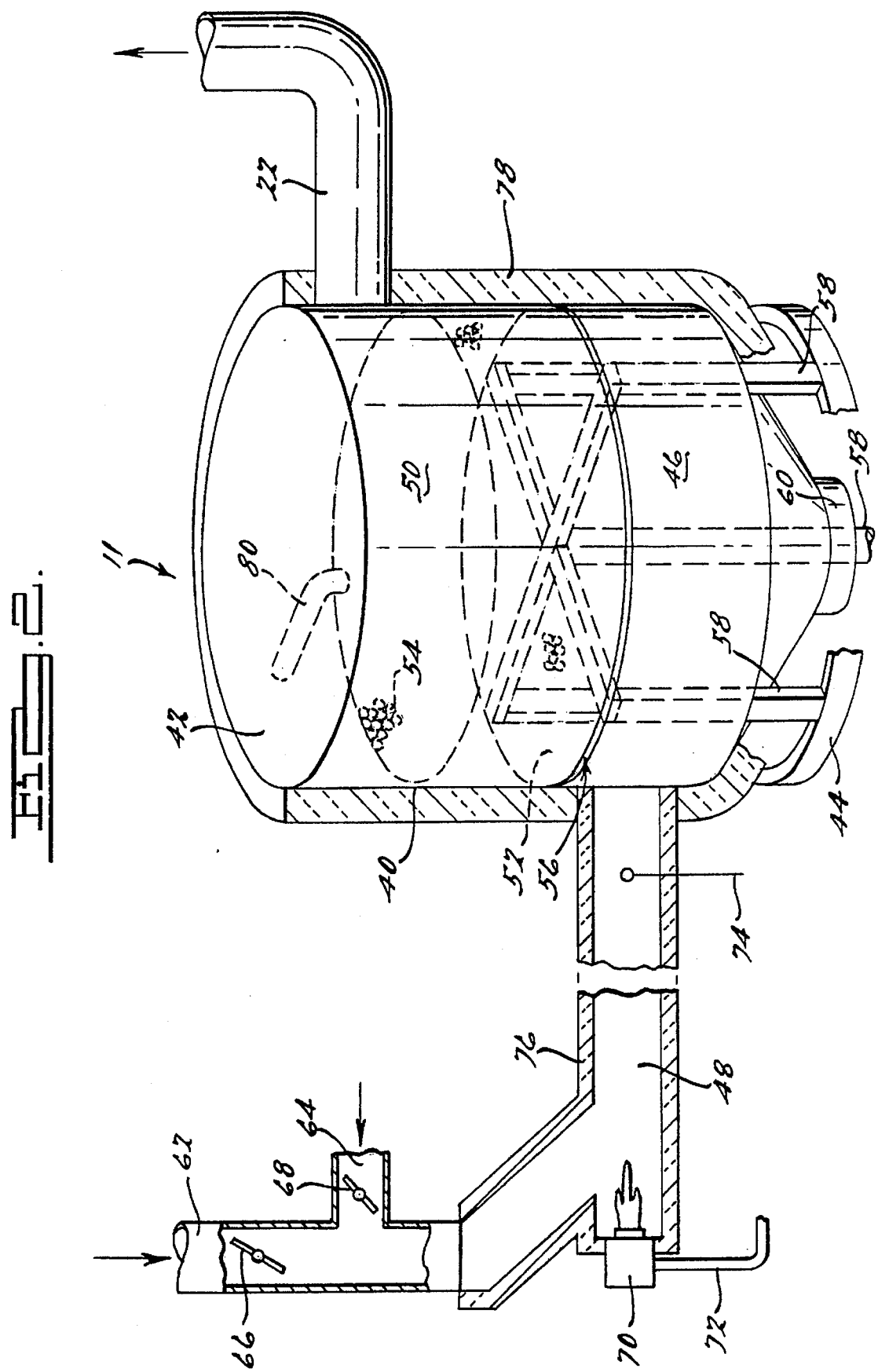
FIG. 2 is a cross-sectional view of the filter system.

As seen in FIG. 2, the filter 11 comprises a cylindrical housing having a side wall 40 and a top wall 42, and is mounted on an annular support base 44. Depending upon the operation of the system, either fresh air or process emissions containing an undesired particulate are admitted into a lower plenum 46 of the filter 11 by an input duct 48. Either the process emissions with a reduced content of particulate or hot innocuous air is conducted away from an upper plenum 50 of the filter 11 by an outlet duct 22 that is in communication with an input of the regenerative incinerator 10.

In accordance with the present invention, the filter 11 includes a filter bed 52 formed from a heat resistant ceramic media 54, for example, a plurality of ceramic heat exchange elements. The position of the filter bed 52 inside of the filter 11 is defined by the position of a horizontal perforated plate 56, which supports the ceramic heat resistant media 54. Perforations are large enough to allow for the flow of process emissions through the filter bed 52, but small enough to retain the ceramic media 54.

A plurality of vertical members 58, which can be constructed from a metal such as steel, are mounted on the support base 44. The vertical members 58 extend downward from the horizontal perforated plate 56 to the support base 44 and provide support for the perforated plate 56.

Because of the cylindrical configuration of the filter 11, the perforated plate 56 and therefore the filter bed 52 are similarly cylindrical in shape. A preferable depth of the filter bed 52 is 24 inches ($\approx$61 cm). Typically, the face area of the filter bed corresponds to the face area of regenerator beds 14, 16 or 18 that are utilized in the regenerative incinerator 10.

In accordance with a preferred embodiment of the present invention, the filter 11 has a hopper (i.e., funnel) design. Therefore, a lower extremity of the lower plenum 46 defines a sump 60, which serves as a drain thereby removing sludge and allowing for material handling capability. The sump 60 extracts fluid, fly ash, and solids from the lower plenum 46.

The filter 11 of the present invention advantageously accommodates two separate stages of operation, a regular abatement process stage and a "bake-off" process stage, described in more detail hereinbelow. In the regular abatement process stage, the filter 11 reduces particulate load in the process emissions before the process emissions enter the regenerative incinerator 10. However, during operation in the regular abatement process stage, the filter bed 52 of the filter 11 can foul. Thus, the present invention utilizes a "bake-off" process stage in order to combat such fouling from the regular abatement process. During the "bake-off" process stage, solid contaminants are purged from the filter 11 by burning off the solid combustible particulates from the filter bed 52.

More particularly, two feed lines 62 and 64 provide for transport into the input duct 48. Each feed line 62 and 64 comprises a damper valve 66 and 68. The pair of damper valves 66 and 68 control whether particulate laden process emissions or innocuous air enters the input duct 48 and hence the filter 11 in accordance with an appropriate operational process stage. The damper valves 66 and 68 operate in on/off positions only. The first damper valve 66 is a process isolation damper valve, which is open during the regular abatement process stage and closed during the "bake-off" process stage. Conversely, the second valve 68 is an innocuous air damper valve, which is closed during the regular abatement process stage and open during the "bake-off" process stage. An external control mechanism drives the valves.

In regular abatement operation, particulate laden emissions enter the input duct 48 from the feed line 62 when the corresponding damper valve 66 is open. At ambient temperature, the emissions travel from the input duct 48 into the lower plenum 46 of the filter 11. The particulate laden emissions pass upwardly through perforations in the horizontal perforated plate 56 and hence through the filter bed 52, which reduces the particulate content of the emissions by trapping solid particulates in the media 54. The emissions, now with a reduced particulate load, continue to flow upwardly into the upper plenum 50, which is in communication with the outlet duct 22. The emissions with the reduced content of particulate then travel from the upper plenum 50 through the outlet duct 22 into the regenerative incinerator 10.

During "bake-off" operation, supplementary heat is provided to the input duct 48 by a conventional gas burner 70 fueled by, for example, natural gas conducted thereto through a feed line 72. Only innocuous air is received by the input duct 48 during the "bake-off" operation. The conventional gas burner 70 heats the innocuous air through direct flame contact. A temperature controller 74 maintains the temperature of the innocuous air at an appropriate level, such as 1000° F. ($\approx$537° C.), through the use of a thermoelectric couple which can measure temperature differences.

Not only does the supplementary heat allow hot innocuous air to enter the filter 11 in order to "bake-off" any fouling which is ordinarily created by the previous regular abatement operation of the present invention, but the 1000° F. ($\approx$537° C.) innocuous air can also be allowed to flow to the regenerative incinerator 10 to "bake-off" any material that has collected at the regenerative incinerator 10. The outlet duct 22 allows for transport of the hot innocuous air from the upper plenum 50 to the regenerative incinerator 10.

In accordance with the present invention, the regenerative incinerator 10 is more receptive to the "bake-off" procedure, because the filter 11 prevents the formation of residual fly ash that collects in the mid-bed regions of the regenerator beds 14, 16 or 18 by reducing or eliminating the content of noncombustible particulates in the process emissions prior to entry into the regenerative incinerator 10. It is noted that the filter 11 "bake-off" operation may create smoke which enters the regenerative incinerator 10, but is removed by the regenerative incinerator 10 prior to atmospheric discharge.

In operation, temperature maintenance is bolstered by the use of insulation. For instance, the exterior of the input duct 48 is provided with conventional fiber insulation 76. In addition, the exterior of the side wall 40 of the filter 11 is also provided with dense ceramic fiber insulation 78, which is mounted on the support base 44.

In addition to the upward innocuous air flow that occurs in the "bake-off" process, the filter 11 can also be supplied with one or more fluid injection nozzles 80, which receive a fluid, such as water or compressed air from an external source (not shown). The fluid injection nozzles 80 are positioned above the filter bed 52 so that the fluid can be flushed downward in order to remove any residual fly ash that forms in the filter bed 52 during the "bake-off" process. The hopper design of the filter 11 enables the fluid containing the fly ash to be drained following passage through the filter bed 52 from the lower plenum 46 into the sump 60.

While the preferred embodiment of the invention has been disclosed, it should be appreciated that the invention is susceptible of modification without departing from the scope of the following claims.

We claim:

1. A regenerative incineration system for oxidizing process emissions having suspended particulates therein comprising:

a particulate filter having a first plenum with an input port for the admission of contaminated particulate laden process emissions at ambient temperature and heated uncontaminated air, selectively, a second plenum having an outlet port for removing contaminated particulate free process emissions, and a ceramic media filter bed positioned between the first and second plenums;

means for heating the uncontaminated air flowing to the first plenum of said particulate filter so as to incinerate particulates directly on the ceramic media filter bed thereof;

a fluid injection nozzle in the second plenum of said particulate filter disposed above the ceramic media filter bed therein for periodically washing incinerated particulates from the ceramic media filter bed in the form of sludge; and a regenerative incinerator having an inlet connected to the outlet of the second plenum of said particulate filter.

* * * * *